US011204450B2

(12) United States Patent
Shen (10) Patent No.: US 11,204,450 B2
(45) Date of Patent: Dec. 21, 2021

(54) METHOD AND APPARATUS OF LIGHT CONTROL USING MICROLENS ARRAYS

(71) Applicant: James Jianming Shen, North York (CA)

(72) Inventor: James Jianming Shen, North York (CA)

( * ) Notice: Subject to any disclaimer, the term of this patent is extended or adjusted under 35 U.S.C. 154(b) by 191 days.

(21) Appl. No.: 16/504,532

(22) Filed: Jul. 8, 2019

(65) Prior Publication Data

US 2020/0025979 A1    Jan. 23, 2020

Related U.S. Application Data

(60) Provisional application No. 62/700,169, filed on Jul. 18, 2018.

(51) Int. Cl.

| | |
|---|---|
| *G02B 3/00* | (2006.01) |
| *F21S 11/00* | (2006.01) |
| *F21V 5/00* | (2018.01) |
| *G02B 7/02* | (2021.01) |
| *E04D 13/03* | (2006.01) |

(52) U.S. Cl.
CPC ......... *G02B 3/0075* (2013.01); *E04D 13/033* (2013.01); *F21S 11/007* (2013.01); *F21V 5/007* (2013.01); *G02B 3/0062* (2013.01); *G02B 7/023* (2013.01); *G02B 2003/0093* (2013.01)

(58) Field of Classification Search
CPC ........ F21V 5/007; F21V 5/004; F21S 11/007; G02B 3/0075; G02B 7/023; G02B 2003/0093; G02B 3/0062; E04D 13/033; E06B 2009/2405; E06B 2009/2423; E06B 2009/2417
USPC .................................. 359/621, 626
See application file for complete search history.

(56) References Cited

U.S. PATENT DOCUMENTS

| | | | | |
|---|---|---|---|---|
| 6,076,933 A  * | 6/2000 | DiLoreto | ............. | G02B 3/0043 |
| | | | | 359/614 |
| 6,384,980 B1 * | 5/2002 | McKinley | .............. | G02B 30/27 |
| | | | | 359/619 |
| 8,873,023 B2 * | 10/2014 | Scholz | ................ | G03F 7/70191 |
| | | | | 355/67 |
| 9,945,988 B2 * | 4/2018 | Powell | ............... | G02B 27/0075 |
| 2014/0340471 A1* | 11/2014 | Grasser | .............. | G02B 19/0052 |
| | | | | 348/36 |

\* cited by examiner

*Primary Examiner* — Zachary W Wilkes

(57) ABSTRACT

The disclosure presents methods and apparatus of light transmission control, comprising two layers of film separated by air, wherein each film is inlaid with a convex micro-lenses array. The first film will focus incoming light through the microlens, whereas the second film contains a grid of opaque areas that will be structured to block or un-block the focal planes of light depending on the thickness of the air layer. When the light is unblocked, the micro lens array in the second film will disperse the light to the other side of the film so it appears transparent or translucent. An attached hand pump can control the thickness of the air layer. The method and apparatus to control light levels is effective, reliable, affordable, intuitive and easy to use. The films can be attached to existing surfaces provide full transparency, a dimming effect, or complete blackout.

20 Claims, 7 Drawing Sheets

METHOD AND APPARATUS OF LIGHT CONTROL USING MICROLENS ARRAYS

CROSS-REFERENCE TO RELATED APPLICATIONS

This application claims the benefit of U.S. Provisional Patent Application No. 62/700,169, filed Jul. 18, 2018. The entire disclosure of the above application is incorporated herein by reference.

FIELD OF THE INVENTION

The present disclosure is in the field of civil engineering, light control, transparency control, and optics.

BACKGROUND

The use of interactive and adaptive technology is being integrated into buildings. Adaptive buildings are able to control operations such as heating, ventilation, air-conditioning, lighting, and even security. The rise of new technology is enabling the possibility of having a user interface with buildings.

An area of focus for interactive home technology is windows. From wanting variable privacy settings to wanting to be eco-conscious, homeowners and business owners alike are clamoring for new tech to meet their needs. People want a convenient solution that helps them save energy while giving them the privacy they need. For those that want to be eco-conscious, large windows are generally the first area targeted, as they are the biggest source of energy loss in a building. Those with large windows may experience over heating or cooling depending on the time of day, seasons, and geographical location of the window. Having window coverings or a method to block light can reduce direct solar gain in the summer, which cuts down on air conditioning costs. In the winter, the light from windows can be used to help heat the room.

Traditional solutions used in the past for privacy and light control include blinds and curtains. However, blinds are difficult to clean as dust gathers on each individual slat. With built-in blinds, dust is not a problem, but their construction and location create problems that can be expensive and complicated to fix. For example, a broken cord or bunched slats would require the disassembly of the entire window to fix. Curtains and roller blinds share many of the same problems. To get a full blackout effect, thick fabric must be used which increases the cost, volume, and bulkiness of the installation. Furthermore, there are only two options for light level: covered and uncovered. Dimming the entire window is only possible with the usage of a separate curtain made from a lighter fabric. In this way, those who want multiple light level choices must invest in different curtains, switching them up when necessary, or layering their curtains. This is not only inconvenient but can also trap or displace dust. In addition to this, blinds and curtains cannot be used with non-rectangular shaped windows, skylights, or on any surface parallel or almost parallel to the ground.

Current solutions for interactive windows that help with privacy and light switching include electro-chromic glass, or switching glazing. This glass can switch a liquid crystal layer between a transparent state and a milky white opaque state by applying a voltage over the two ends of the LCD. The change between the two states can take several minutes and requires electricity, which could be a problem during a power outage, or require an extra battery unit to maintain. These windows are complicated and difficult to install without a professional, as a non-standard electrical hookup wiring is needed. They are also more expensive and problematic than solutions such as blinds or curtains.

There also exists nano-technology window covering films. This product can absorb selected frequencies of light such as UV or infrared and heat. The problem with this product is its fixed transparency, and fixed type of light frequency. Due to its static nature, this film can only block one type of frequency. To change frequencies, people would need to switch films, making this product inconvenient to use. When the film is installed, turning off the frequency blocking is impossible without removing the film itself.

In optics, the refractive index or index of refraction of a material is a dimensionless number that describes how light propagates through that medium. Essentially, the index determines how much the path of light is bent or reflected when entering a material. When light moves from one medium to another, it changes direction, i.e. it is refracted. When light enters a material with higher refractive index, the angle of refraction will be smaller than the angle of incidence and the light will be refracted towards the normal of the surface. The higher the refractive index, the closer to the normal direction the light will travel. When passing into a medium with second refractive index, the light will instead be refracted away from the normal, towards the surface.

A lens is a transmissive optical device that focuses or disperses a light beam by means of refraction. A simple lens consists of a single piece of transparent material, typically spherical in shape, meaning that the two surfaces of a lens are parts of the surface of spheres. Each surface can be convex (bulging outwards from the lens), or concave (depressing into the lens), or planar (flat). Lenses are classified by the curvature of the two optical surfaces. A lens is bi-convex (or double convex) if both surfaces are convex. A lens is bi-concave (or double concave) if both surfaces are concave. If one of the surfaces is flat, the lens is plano-convex or plano-concave depending on the curvature of the other surface. If the two surfaces are reversed, the lens is convex-plano or concave-plano lens. If a lens' overall curvature appears as convex, then the lens is simply called a convex lens; if a lens' overall curvature appears as concave, then the lens is simply called a concave lens. If the lens is convex, a collimated beam of light passing through the lens converges to a spot at its focal point behind the lens. The distance from the lens to the focal point is the focal length of the lens, and this spot lies upon the focal plane. If the light passing through the lens is coming from a single source at the focal point, the light will exit from the lens as a collimated beam.

The disclosure presents a novel method for light control using air-separated double-microlens array film, which solves all of the previous problems. The film is cling directly to an existing window surface making it easy to install and uninstall without needing to retrofit the entire window. There is no extra window surface area to clear, as it only occupies little additional space around the window. These films can be used to turn a building into a climate adaptive building shell under users' full control. Whereas conventional buildings are static building shells, climate adaptive building shells contribute to energy saving for heating, cooling, ventilation, and lighting. They also create a positive impact on the indoor environment quality of buildings. With the installation of these films, the building is able to adapt to changing weather conditions and occupant requirements without the use of electricity and complicating wiring. Light controls can be operated manually completely with the owner's intention.

And unlike blinds or switching glazing, these films can allow through an entire range of light, from translucent to blackout.

SUMMARY

The disclosure presents novel methods and apparatus of light transmission control, comprising two layers of film separated by a layer of air, wherein each film is inlaid with an array of convex micro-lenses. The first layer of film will focus incoming light into specific areas using the microlens array, whereas the second layer of film contains a grid of opaque areas that will be structured to block or un-block the focal planes of light depending on the thickness of the air layer, and its position relative to the first film. When the light is unblocked, the micro lens array in the second film will disperse the light to the other side of the film so it appears transparent or translucent. An attached hand pump can control the thickness of the air layer. The method and apparatus to control light levels is effective, reliable, affordable, intuitive and easy to use. The films can be attached to existing surfaces provide full transparency, a dimming effect, or complete blackout.

DETAILED DESCRIPTION

The disclosure presents a set of methods and apparatus designed to add new light control features to existing transparent or semi transparent surfaces. These surfaces include but are not limited to glass panes, windows, dividing screens, as well as any clear, transparent surfaces that allow light to pass through. The methods and accessory designs presented in this disclosure will serve for exemplary purpose but not be regarded as limited to those examples. The exemplary methods and accessory designs and all other possible variants obvious to the ordinary skilled in the art are intended to take advantage of the modification of the frequency domain of the existing light signal travelling through a lens to control the amount of light frequencies passing through a surface.

Figure 1:
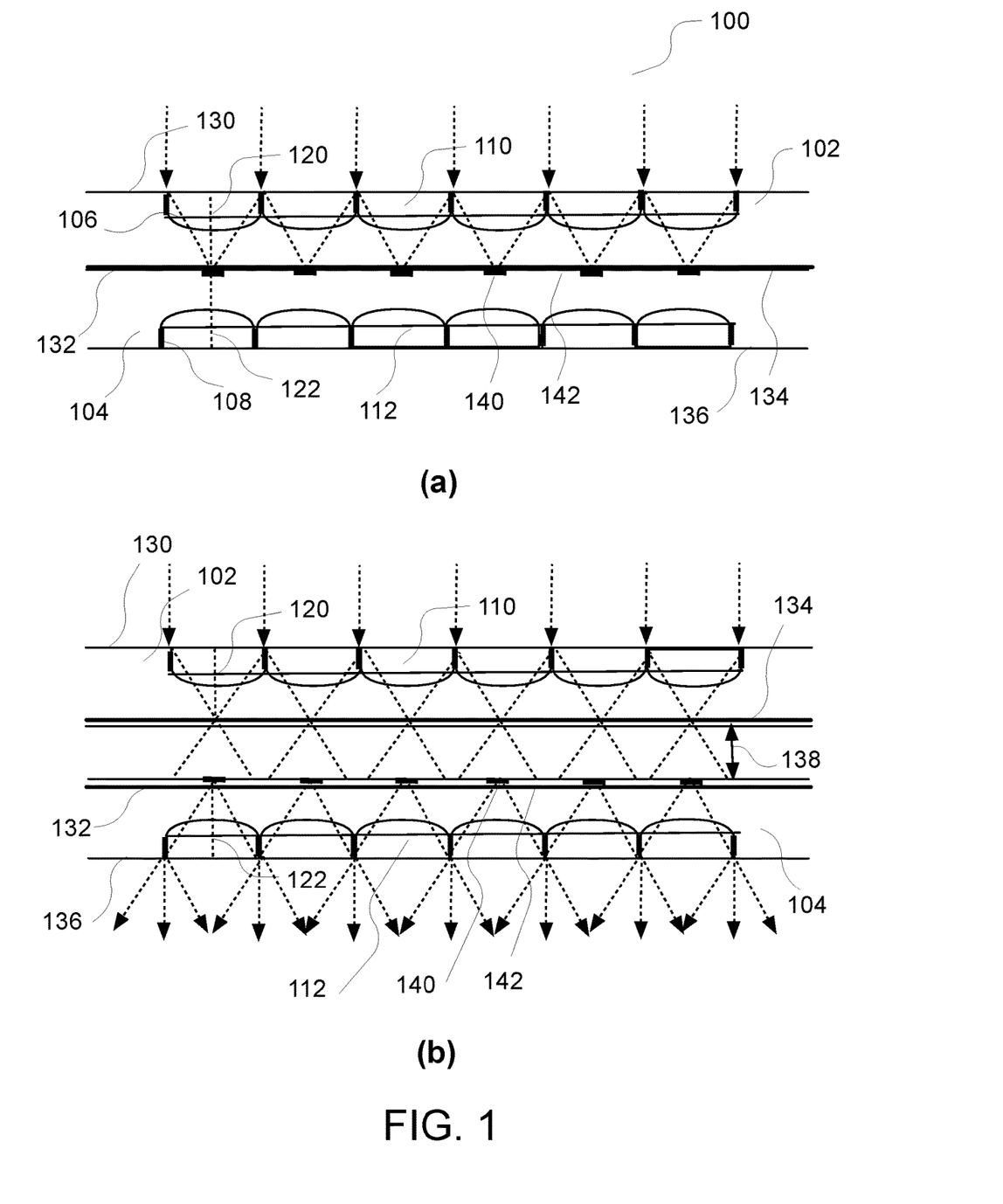
FIG. 1 illustrates a preferred embodiment of the air-separated double-layer microlens-array film design for light control.

FIG. 1 illustrates a preferred embodiment of the air-separated double-layer microlens-array film design (100) for light control. More variants and alternative designs will be illustrated in the following sections and figures. The specific design described here is only for convenience in illustrating the basic idea of the invention but not to be regarded as a limitation to the design options. This includes possible variants that are more elegant in mechanical design to achieve similar function purposes and variants with different shapes, structures, colors and material.

Sub-FIG. 1 (a) illustrates a first position of the preferred embodiment of the air-separated double-layer microlens-array film design for light control. In the first position, light is unable to pass through the surface covered by the two double-layer microlens-array films, which creates a blackout effect. The design consists of two layers of film: a transparent first film (102) with an array of inlaid cylinders where the bottom faces are convex micro-lenses (110) curving in from the first edge of the film (130), and a transparent second film (104) with an array of inlaid cylinders where the top faces are convex micro-lenses (112) curving in from the second edge of the film (136). The first layer of film (102) and the second layer of film (104) are made of a first material with a refractive index N1; and all the inlaid cylinder convex micro lens arrays are made of a second material with a refractive index N2.

In one embodiment of the present disclosure, the lens attached to the cylinder's face is plano-convex. The cross section view of this shape (110) is a rectangle until (106) with a plano-convex lens either on top of or below the rectangle. The entire cylinder will be wholly referred to as the cylindrical convex micro lens. The sides of the cylindrical inlaid section (108) are opaque up to the surface (106). The opaque walls prevent light that enters the current cylindrical inlaid section (110) from passing into its adjacent cylindrical inlaid section. Among all the light rays entering the section, only those almost perpendicular to the lens plane can go through the convex lens and converge to the focal point area.

In one embodiment of the present disclosure, the material of each convex micro lens (110, 112) has a much higher index of refraction N2 than the film (102,104) N1. Thus, when light is shining through the surface of the first film, the focal point of each micro lens (120) is located exactly at the bottom edge of the first film (102), as the thickness (120) of the first and second film (122) are built to be the focal distance (120,122) of the convex lenses (110,112).

In one special embodiment of the present disclosure, the material of the film is air and the material of the micro lens is glass. This means that air is encased by a thin material along the bottom edge of the film. Along the top edge, it is encased by the micro lens and by the same thin material where there is no micro lens. For this specific case, the focal distance, or thickness of the transparent film can be the shortest as the refractive index of air is essentially 1 at standard temperature and pressure.

The point where light converges (140) due to the micro lens is on the top surface of the second film (104). In the preferred embodiment of the present disclosure, this area is opaque, whereas the rest of the film (142) is transparent. For example, if the focal point is a dot on the surface of the second film (104), only that dot would be opaque and the rest of the film would be transparent. This opaqueness can be achieved with techniques including, but not limited to, painting, adding an opaque material, or decals. For techniques involving applying another medium to the film, such as paint or decals, the material is thinly mounted on the first surface of the second film (104).

In one embodiment of the present disclosure, transparent magnetic strips or dots (134) are placed along the bottom surface of the first film (102). Other transparent magnetic strips or dots (132) are placed along the first surface of the second film (104). These magnetic strips or dots are very thin compared to the width of the film itself. The magnetic strips or dots do not have to be placed in long continuous strips but can also be placed sporadically across the surface of the film. Possible arrangements include, but are not limited to, checkerboard dot grid, rectangular dot grid, randomly spread dots, vertical or horizontal strips across the film, or a frame along the edge of the film.

Except for the opaque areas, the second film (104) is physically the same as the first film (102), only rotated 180 degrees. The similarly distributed magnetic strips or dots attract the magnetic strips or dots on the first film (102). The two films are to be attached by the first magnetic material (134) and the second magnetic material (132). The first and second magnetic material must be of opposite polarity to attract each other and attach. Other options include using a thin magnetic material on one film, and only one magnetic strip on the other film. To one ordinarily skilled in the field, many other design variations can be created, as long as the films attach when they are in close proximity and detach with minimal difficulty.

Sub-FIG. 1 (a) illustrates that when both films are attached using the magnetic material, due to the small size of the micro lenses (110) and the opaque wall (108), the resulting rays of light (100) shining through the micro lenses are all inherently 90 degrees to the surface of the film (130). In other words, because the micro lenses are so small, on that scale, any incoming light is considered to be coming from far away. Due to this fact and the difference in scale of the micro lenses to any incoming light, all incoming light is essentially coming at the surface perpendicular to the film, that is, at 90 degrees. When the light rays shine through the first film (102) and through the micro-lenses, they all converge at the focal point (140) of each micro lens. At this converged location, the top surface of the bottom film (104) is opaque. Light cannot pass through this opaque section and therefore basically no light is passed through the second film (104) at all. This causes a blackout effect on the surface on which the films are placed. That is, light can no longer pass through the previously transparent or semi-transparent surface.

Sub-FIG. 1 (b) illustrates a second position of the same preferred design embodiment described in FIG. 1 (a). In this position, light can pass through the surface the two films are installed on. At this time, the first film (102) and the second film (104) are separated by a gap (138) such that when light (100) passes through the focal point, it is no longer completely blocked by the opaque area (140) of the second film (104). This is because when the second film (104) is separated from the first film by a certain distance, the light no longer converges on the top surface of the bottom film (104). The light travels through the focal plane inside the gap and starts to disperse when it enters the first surface of the second film (104) where it is further dispersed by the array of convex micro lenses (112) located in the second film (104). This allows light to pass through the surface with negligible blockage from the opaque sections (140), creating the appearance of a highly translucent surface. The surface that this film is installed on would now appear to be fully translucent and would let light through depending on how big the gap (138) is. The larger the gap (138) is, the more light passes through until almost 100%.

Figure 2:
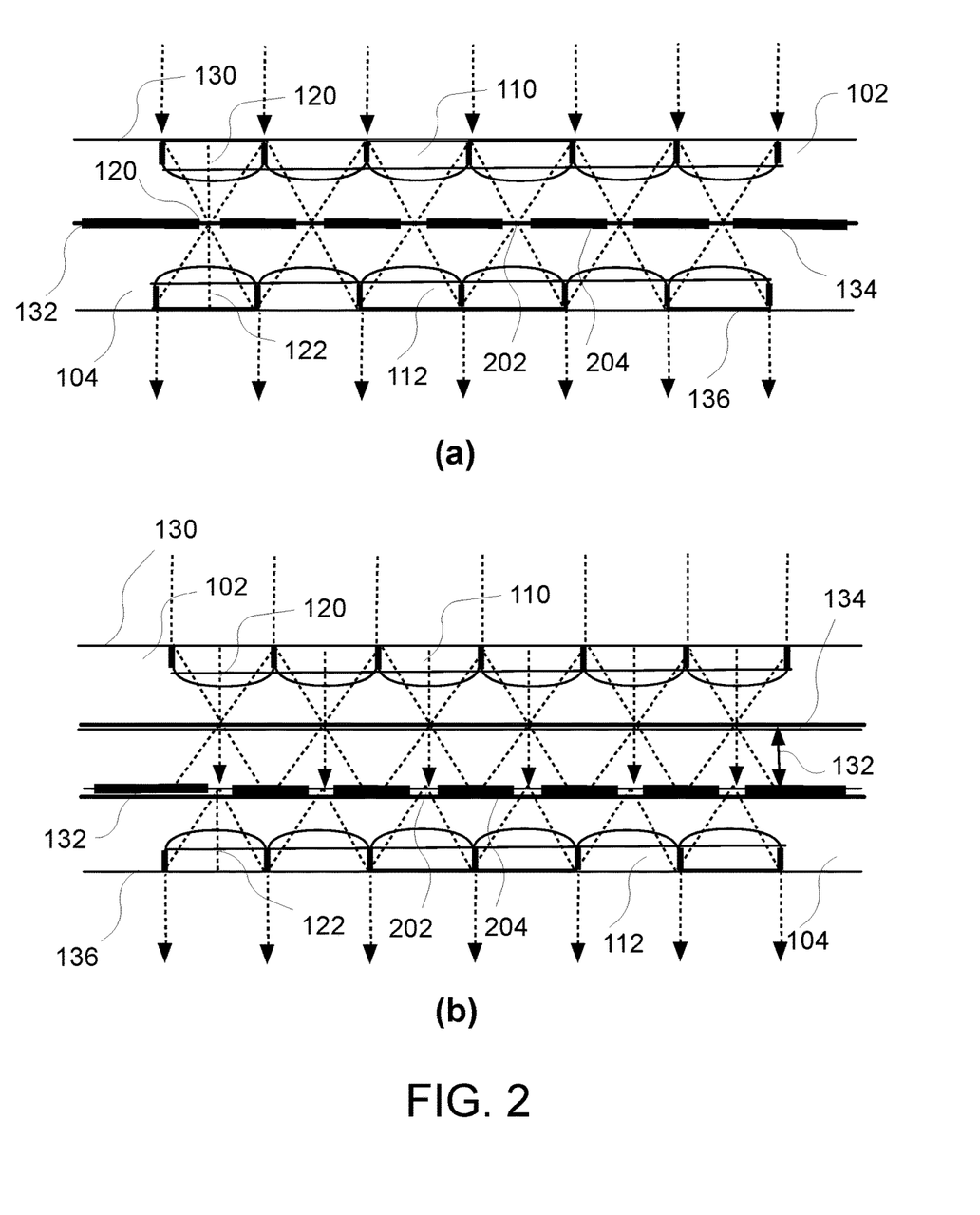
FIG. 2 illustrates an alternative embodiment of the air-separated double-layer microlens-array film design for light control.

FIG. 2 illustrates two positions of an alternative embodiment of the air-separated double-layer microlens-array film design. For this alternative design embodiment, light passes through when the two films are attached with no gap, and light is blocked when the two films are separated. In the embodiment of the present disclosure in Sub-FIG. 2 (a)—when the two films are attached together—the design consists of two films. There is a transparent first film (102) with an array of inlaid cylinders where the bottom faces are convex micro-lenses (110) curving in from the first edge of the film (130) and a transparent second film (104) with an array of inlaid cylinders where the top faces are convex micro lenses (112) curving in from the second edge of the film (136). The first layer of film (102) and the second layer of film (104) are made of a first material with a refractive index N1, and all the inlaid cylinder convex micro lens arrays are made of a second material with a refractive index N2. The lens on the cylinder's face is plano-convex. The cross section view of this shape is a rectangle with a plano-convex lens either on top of or below the rectangle. This entire shape will wholly referred to as the convex micro-lens. The sides of the cylindrical inlaid section (108) are opaque up to the surface (106). The opaque walls prevent light that enters in the current cylindrical inlaid section (110) from passing into its adjacent cylindrical inlaid section. Among all the light rays entering the section, only those almost perpendicular to the lens plane can go through the convex lens and converge to the focal point area.

In one embodiment of the present disclosure, the material of each convex micro lens (110, 112) has a much higher index of refraction N2 than the film (102,104) N1. Thus, when light is shining through the surface of the first film, the focal point of each micro lens (120) is located exactly at the bottom edge of the first film (102), as the thickness (120) of the first film and second film (122) are built to be the focal distance (120,122) of the convex lenses (110,112).

In one special embodiment of the present disclosure, the material of the film is air and the material of the micro lens is glass. This means that air is encased by a thin material along the bottom edge of the film. Along the top edge, it is encased by the micro lens and by the same thin material where there is no micro lens. For this specific case, the focal distance, or thickness of the transparent film can be the shortest, as the refractive index of air is essentially 1 at standard temperature and pressure.

The point where light converges (202) due to the micro lens, is on the top surface of the second film (104). This area is transparent, whereas the surface of the rest of the film (204) is opaque. For example, if the focal point is a dot on the surface of the second film (104), only that dot area would be transparent and the rest of the film would be opaque. This opaqueness can be achieved with techniques including, but not limited to, painting, adding an opaque material, or decals. For techniques involving applying another medium to the film, such as paint or decals, the material is thinly mounted on the first surface of the second film (104).

In one embodiment of the present disclosure, transparent magnetic strips or dots (134) are placed along the bottom surface of the first film (102). Other transparent magnetic strips or dots (132) are placed along the first surface of the second film (104). These magnetic strips or dots are very thin compared to the width of the film itself. The magnetic strips or dots do not have to be placed in long continuous strips but can also be placed sporadically across the surface of the film. Possible arrangements include, but are not limited to, checkerboard dot grid, rectangular dot grid, randomly spread dots, vertical or horizontal strips across the film, or a frame along the edge of the film.

Except for the opaque areas, the second film (104) is physically the same as the first film (102), only rotated 180 degrees. The similarly distributed magnetic strips or dots attract the magnetic strips or dots in the first film (102). The two films are to be attached by the first magnetic material (134) and the second magnetic material (132). The first and second magnetic material must be of opposite polarity to attract each other and attach. Other options include using a thin magnetic material on one film, and only one magnetic strip on the other film. To one ordinarily skilled in the field, many other design variations can be created, as long as the films attach when they are in close proximity and detach with minimal difficulty.

Sub-FIG. 2 (a) illustrates that when the two films are attached using the magnetic material, due to the small size of the micro-lenses (110) and the opaque wall (108), the resulting rays of light (100) shining through the micro-lenses are all inherently 90 degrees to the surface of the film (130). In other words, because the micro-lenses are so small, on that scale, any incoming light is considered to be coming from far away. Due to this fact and the difference in scale of the micro lenses to any incoming light, all incoming light is essentially coming at the surface perpendicular to the film, that is, at 90 degrees. When the light rays shine through the first film (102) and through the micro lenses, they all converge at the focal point (140) of each micro lens. After the light passes through the non-opaque area on the second film (104), the light is re-dispersed by the micro lenses (112) located in the second film (104). The light passes through both films unobstructed due to the use of two micro lenses in opposing directions, giving the effect of a translucent surface.

Sub-FIG. 2 (b) illustrates how light is blocked when the two films are separated by a certain gap (132). Because of the gap, the light no longer converges on the top surface of the second film (104). The light travels through the focal plane inside the gap and starts to disperse when it enters the first surface of the second film (104) where it is further dispersed by the array of convex micro-lenses (112) located in the second film (104). Only the light rays passing directly through the center of the lens (110) will pass through the non-opaque area (202) of the second film (104). All other light rays will be blocked by the opaque area (204). Therefore the total light that will pass through the second film (104) is negligible compared to the light being blocked, thus creating a blackout effect when the two films are separated by a certain distance (132). Depending on the distance (132), the light will seem to be blocked entirely or only partly, allowing for varying lighting effects. The larger the gap (138) is, the less light passes through until it is almost 100% blocked.

Figure 3:
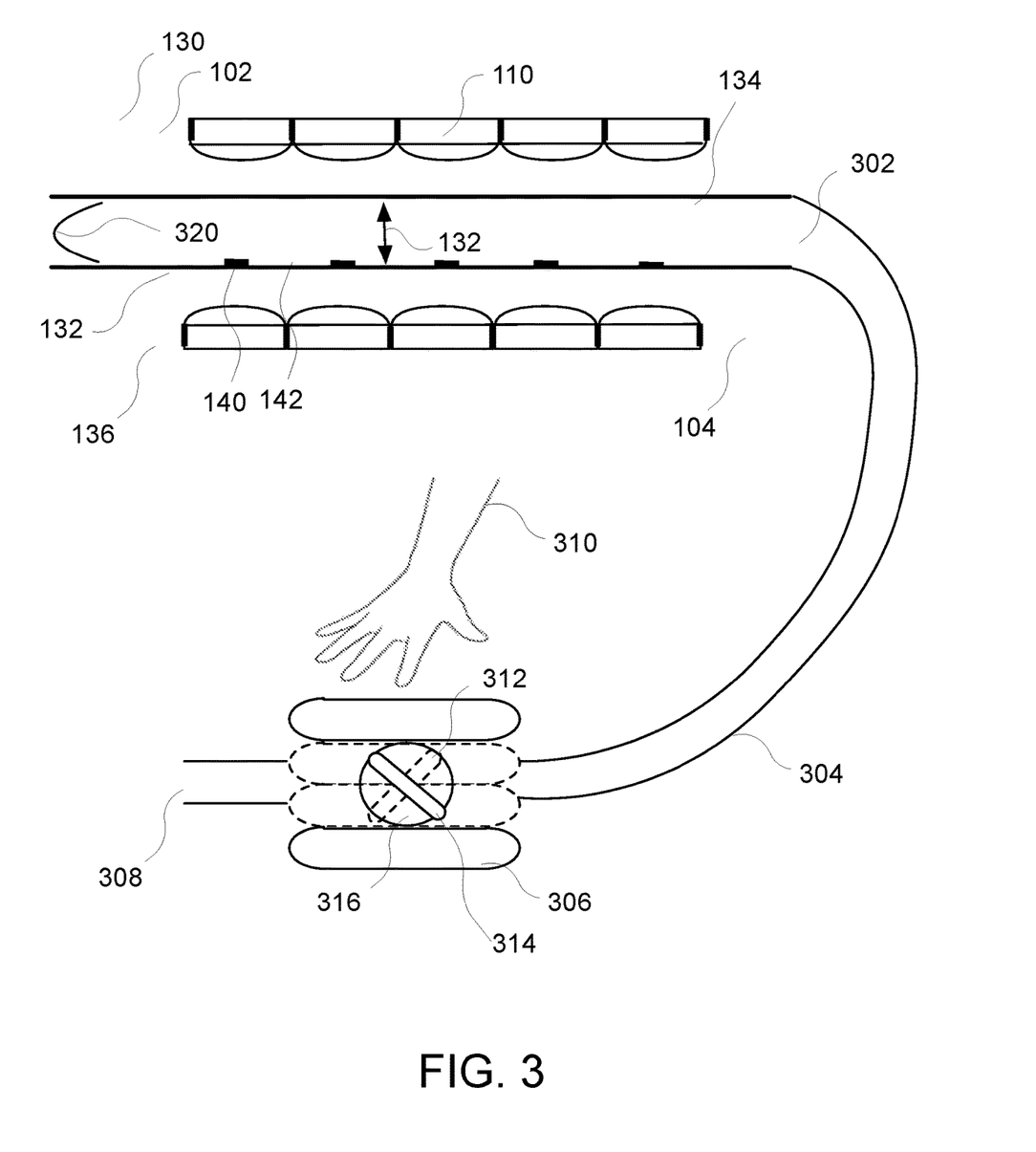
FIG. 3 illustrates an exemplary embodiment of the air layer adjustment with a hand pump.

FIG. 3 illustrates an exemplary apparatus design embodiment for a mechanism to separate the double-layer microlens-array films. The apparatus consists of tubing (304) that connects to a clear pouch spanning the entire surface of the first film (102) and the second film (104) at an opening point (302). This pouch can more or less be described as a rectangular prism. It lies between the two films for the entirety of the film's surface area. On the other side, the tubing (304) is connected to an air pump (306) that has a control switch (316). This control switch can have any design but always has at least two states: state (314), —where the valve is closed and no air can be released from the end of the tube (308), which allows for the tube and pouch to be filled with air using the pump, and state (312), —where the air can be freely released from the end of the tube (308) allowing for the tube and pouch to be deflated.

When the pump control switch (316) is turned to the state (314), a human hand (310) can press the pump (306) to inflate the pouch (320) through the tube (304). Since the pouch gap (132) is normally small, even though the area of the pouch (320) may be large, the total volume of the air is still small, so the effort to pump up the pouch (320) should be negligible. The gap distance (132) will be determined by the amount of air being pumped inside the pouch (320). The more air is pumped in, the larger the gap distance (132).

When the tube and consequently the attached pouch are filled with air, the first magnetic material (134) and second magnetic material (132) are forced to disconnect as the first film (102) and the second film (104) are separated by the inflating pouch between them. The pouch is inflated to a certain point to create a specific separation distance (132) between the two films. As in the embodiment disclosed in FIG. 1, this allows light to pass through both films as the light is no longer completely blocked by the opaque areas of the second film (136). When the air is released from the tubing, the first magnetic strip (134) and second magnetic material (132) becomes attached, as there is no resistance from the air in the pouch to keep them apart. Due to the placement of micro-lenses as disclosed in FIG. 1, a blackout effect is created on the surface the films are installed on, as light is blocked from exiting the second film (104). This light is blocked by strategically placed opaque sections on the surface of the second film (104).

The specific design described here is only for convenience in illustrating the basic idea of the invention, and is not to be regarded as a limitation to the design options. This includes the possible variants that more elegant in mechanical design but achieve the similar function purpose and the variants with different shapes, structures, colors and materials.

Figure 4:
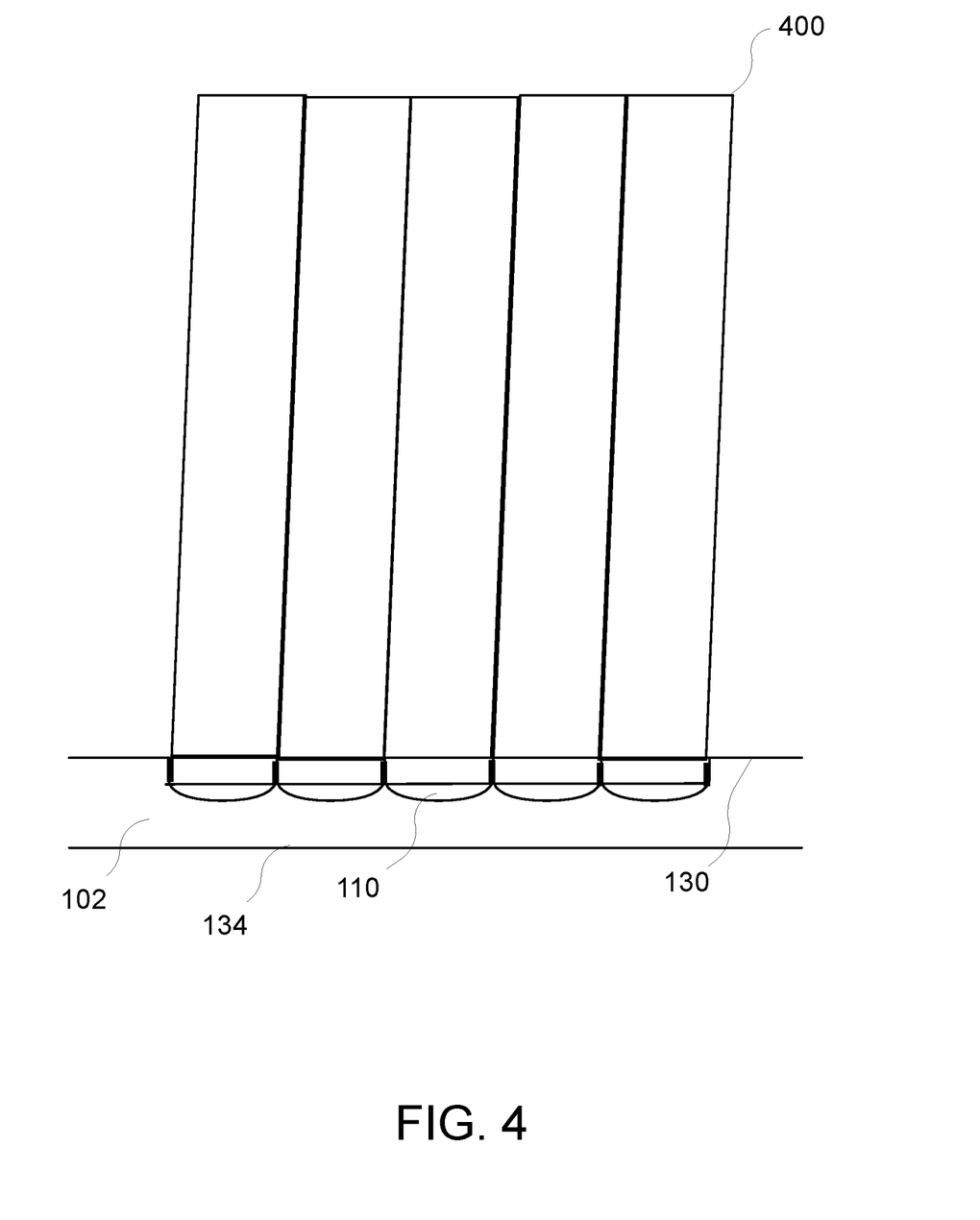
FIG. 4 illustrates an exemplary microlens array as a lenticular lens design embodiment of the present disclosure.

FIG. 4 illustrates a design embodiment for an arrangement (400) of micro-lenses in the film. All micro-lenses are arranged as lenticular lenses. A lenticular lens is an array of magnifying lenses, or convex lenses. From above (130), the micro-lenses (110) will look rectangular in shape, and the cross section view is of a plano-convex lens on top or below a rectangle shape. The micro lenses extend straight down into the film (102) before curving into the lens shape. This shape can be described as a rectangular prism with the bottom face being part of a cylinder. The sides of the rectangular prism that is the section of the lens going straight down into the film (102) are also opaque to prevent light from traveling through multiple lenses. The micro-lenses are inlaid into the film (102) in rows, with varying distances between each row. In FIG. 4, the rows of micro-lenses (110) are inlaid directly side by side. Note that these rows could also be perceived as columns based on the direction of the film. Since the micro-lenses only converge light in one dimension, the lenticular lenses will converge incoming light into parallel beams. The focal area of each lens is a straight line instead of a point. A thin magnetic material (134) is placed on the bottom of the film (102). The magnetic material (134) is very thin compared to the width of the film itself.

As per the preferred embodiment of the present disclosure described in FIG. 1, the focal areas of the micro-lenses are opaque, whereas the other areas are clear. In this design embodiment, the focal area appears as a line from above. This line of focal points on the film is opaque, however the line is not limited to being continuous, meaning sections could be opaque or translucent, allowing for a dimming effect as opposed to a total blackout effect. The majority of clear areas on the film (102) are located on either side of the opaque lines and look similar to rectangles from above. The other transparent sections of the film consist of all the non focal point areas on the surface of the film (130) and all focal areas that are opaque. The magnetic material (134) need not be continuous, linear or evenly distributed, but can be placed to avoid blocking the focal areas on the first film if they are not transparent.

As per the preferred embodiment of the present disclosure described in FIG. 2, the focal areas of the micro-lenses are transparent, whereas the other areas are opaque. In this design embodiment, the focal area appears as a line from above. This line of focal points on the film is clear, however the line is not limited to being continuous, meaning sections could be clear or translucent, allowing for a dimming effect as opposed to a completely clear effect. The majority of opaque sections on the film (102) are located on either side of the clear lines and look similar to rectangles from above. The other opaque sections of the film consist of all the non-focal line areas on the surface of the film (130) and all focal areas that are transparent. The magnetic material (134) need not be continuous, linear or evenly distributed, but can be placed anywhere except for the focal areas on the first film if they are not transparent.

Figure 5:
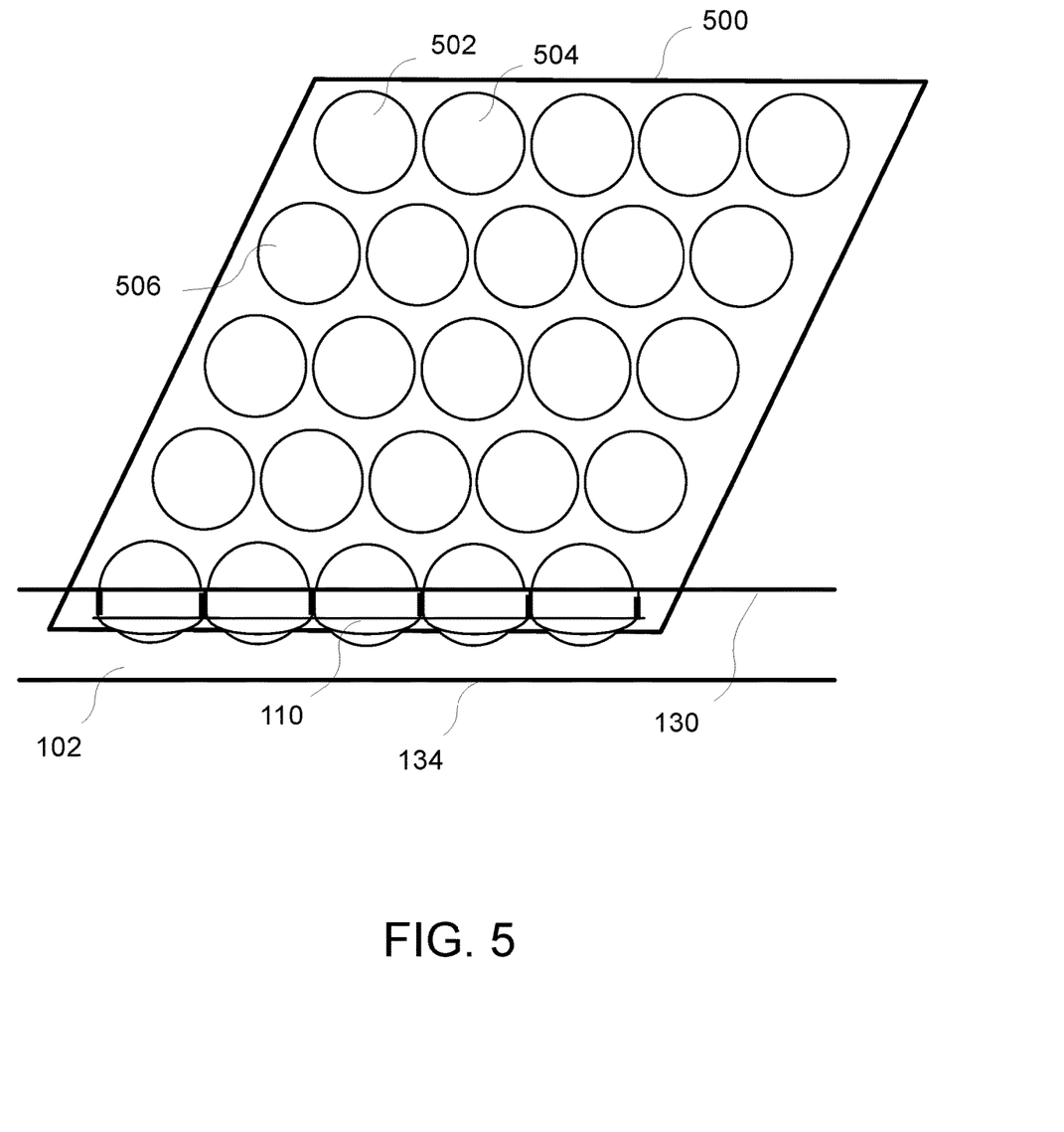
FIG. 5 illustrates an alternative microlens array as a checkerboard convex lens design embodiment of the focal lens component of the present disclosure.

FIG. 5 illustrates an alternative design embodiment for an array arrangement (500) of micro-lenses in the film. All micro-lenses are arranged as a grid of lenses. From above (130), the micro-lenses (502,504,506) can be seen as distinct circles on the surface of the film. The cross-section view shows the lenses (110) as a rectangle with the top or bottom face in a plano-convex lens shape. The micro-lenses extend down from the surface of the film (130) into the film itself (102) before curving into a lens shape. The sides of the rectangular section are opaque to prevent light from passing through multiple lenses. A thin magnetic material (134) is placed on the bottom of the film (102). The magnetic material (134) is very thin compared to the width of the film itself. The magnetic material (134) need not be continuous, linear or evenly distributed, but can be placed to avoid blocking the focal points on the first film if they are not transparent.

The grid arrangement can be, but is not limited to, square close-packed, i.e. regular square grid, where lens (502) is directly above lens (506) and to the left of lens (504); and hexagonal close-packed, i.e. checkerboard, where the angle that the centre of lens (502) to lens (504) makes with the centre of lens (502) to lens (506), is 60 degrees. The hexagonal close-packed arrangement would create the least amount of space between each micro lens, meaning the maximum number of micro-lenses would be able to fit in the surface.

The space between each row and column of micro-lenses may vary and does not need to be linear. The number of rows and columns may also vary independently. In those cases, the angles between lens (502), (504) and (506) will vary, but lens (502) will always be to the left of lens (504), and lens (502) will always be above lens (506). The micro-lenses also do not need to be arranged in rows or columns, and can be presented sporadically or randomly.

As per the preferred embodiment of the present disclosure described in FIG. 1, the focal points of the micro lenses are opaque. This allows for light to pass through when the films are separated and for light to be blocked when the films are attached together. For this design grid embodiment, the focal points appear as a grid of dots from above. These focal point spots are not limited to being all filled in, certain focal points for various lenses, such as (502), (504) or (506), may not be opaque. This means that while the entire surface of the film can contain micro-lenses, only one side could have opaque sections which block light. If there is an even distribution of focal points where the film is transparent and focal points where the film is opaque, there will be an even light-dimming effect rather than a full blackout effect. The transparent areas of the film consist mainly of all the non focal point areas on the surface of the film (130) and all focal points are opaque.

As per the preferred embodiment of the present disclosure described in FIG. 2, the focal points of the micro-lenses are transparent, whereas the other areas are opaque. In this grid design embodiment, the focal points appear as a grid of dots from above. The focal points on the film are clear, however the focal point is not limited to being continuous, meaning areas could be clear or translucent to allow for a dimming effect as opposed to a completely clear effect. The majority of opaque areas on the film (102) are located on either side of the clear areas and look similar to rectangles from above. The other opaque areas of the film consist of all the non focal point areas on the surface of the film (130) and all focal areas that are transparent. The magnetic material (134) need not be continuous, linear or evenly distributed, but can be placed anywhere except for the focal areas on the first film if they are not transparent.

Figure 6:
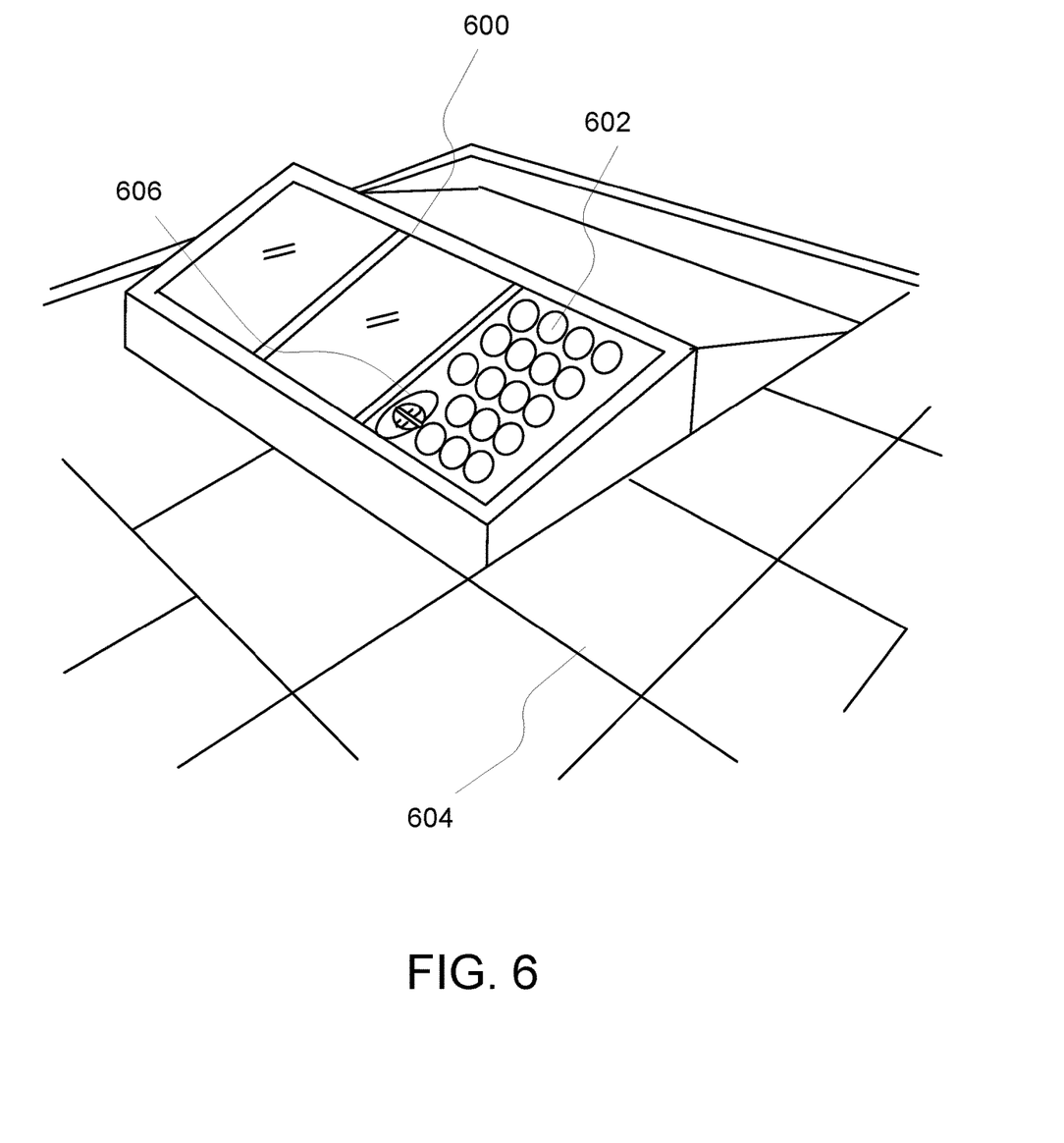
FIG. 6 illustrates an exemplary installment embodiment of the present disclosure on a skylight window.

FIG. 6 illustrates an exemplary apparatus installation embodiment of the present enclosure used in a skylight. The window (600) is located on a roof (604) and consists of the films described in the present disclosure. For this example, the window is part of a skylight that works to allow light into the space below when the air layer separation is zero and the magnetic pieces in the first and the second film attach to each other. The micro-lenses (602) are laid out in a grid array, creating focal points that form an array of dots. The micro-lenses can also be laid out in rows as described in FIG. 4, or in any other formation that achieves the same result. In those varying cases the focal points could be in a line or any other formation. There is a control switch (606) connected to a pump as described in FIG. 3 which controls the separation distance between the first and second film. This is done by pumping air by hand through the tube into the thin flat pouch that spans the entire surface of the film.

When the pouch is filled with air, the two films start to separate, else wise if there is no air, the films are attached together due to the magnetic pieces. The pump and control switch (606) are installed near the window for convenience, and allow the user to be onsite while adjusting the light level, though the pump is not limited to being installed in the immediate vicinity. The control and pump can be used in conjunction to create varying lighting effects that include, but are not limited to, dimming, blackout, and fully transparent. In yet another alternative embodiment of the present disclosure, the control switch (606) and pump system may be disconnected or left on the window (600) after the desired lighting effect has been achieved.

The specific design and use cases described here are only for convenience in illustrating the basic idea of the invention and are not to be regarded as limitations to the design options. This includes possible variants with more elegant mechanical design but achieve a similar function, or purpose, and variants with different shapes, structures, colors and materials.

Other uses of such a system could include privacy screens. For example, in an office setting, these films could be utilized on an adjoining transparent wall to provide privacy for each room. These films could also be installed all around a single office, such that when the films are not allowing any light through, the office enclosed would have total privacy. The uses of these films can range from privacy to temperature control using sunlight in a room.

Figure 7:
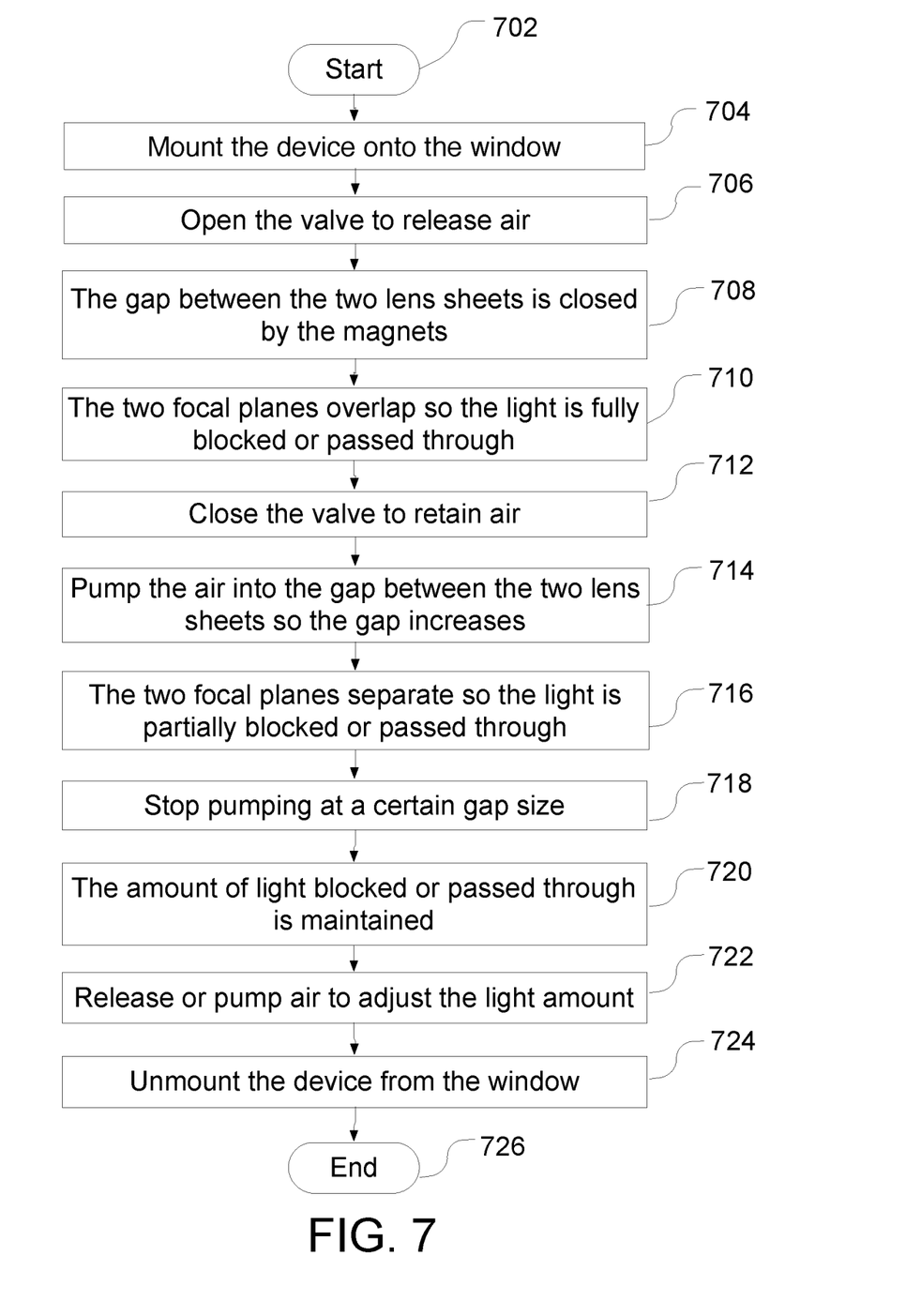
FIG. 7 illustrates an exemplary workflow of the installation and usage of the present disclosure on a window.

FIG. 7 illustrates an exemplary workflow of the method to control light in a window of the present disclosure. The start (702) of the workflow begins with the mounting (704) of the control switch and pump device as described in FIG. 3. The control switch and pump are typically mounted at a location near the window or surface where the films are installed. However, its placement is not limited to being near the installation. The valve can then be switched on or off depending on the design of the pump (706) so that the air in the tubing and pouch is released. This causes the tubing and pouch to deflate, bringing the first and second film closer together as well as removing the pressure that causes the first and second film to stay separated. As the tubing is now deflated, the magnetic strips on the two films will attach together. The first and second films will attach together, and the gap between the two films (708) will be closed. The plane of focal areas of light going through the first film shifts to either overlap or avoid the opaque areas on the second film (710). This shift is caused by the fact that the two films are now attached. For example, as described in FIG. 1, when the two films are attached together, the plane of focal areas of light is blocked by the opaque sections on the second film. Depending on the design and placement of opaque sections, light is fully blocked or allowed through the window or surface. The valve that released the air is then closed so that air no longer escapes the tubing (712). Air can then be pumped into the tubing using the installed pump. Pumping more air into the tube increases the gap between the two films so that the light is partially blocked or allowed through the window (716). At the desired level of brightness, air is no longer pumped into the pouch so that the gap between the two films stays constant (718). With the gap size between the two films kept constant from the inflated pouch, the light level is also kept constant (720). The valve can then be released so that some air escapes. The valve can also be locked so more air can be pumped into the tubing to adjust the light level (722). To end (726) the process, the switch and pump device can be removed from the window (724).

What is claimed:

1. A method of adding light transmission control to a light transmissive surface, comprising:
   providing a first layer of film with a first and second film surface; wherein the first film surface is on the light transmissive surface;
   providing a second layer of film with a third and fourth film surface; wherein the first layer of film is sandwiched between the second layer of film and the light transmissive surface;
   enclosing an air layer between the first and second layers of film; wherein the air layer is also between the second and third film surfaces;
   wherein each layer of film is inlaid with an array of transparent micro-lenses; wherein each micro-lens in the first layer of film has a focal point on the second film surface and each micro-lens in the second layer of film has a focal point on the third film surface;
   wherein each micro-lens in the first layer of film is center-aligned with a micro-lens in the second layer of film and vice versa;
   adjusting the air layer and distance between the second and third film surfaces to control the light transmission of the light transmissive surface.

2. The method of claim 1, wherein the first and second layer of film are made of light transmissive material.

3. The method of claim 2, wherein the micro-lenses in the first layer of film have a refractive index higher than that of the first layer of film; the micro-lenses in the second layer of film have a refractive index higher than that of the second layer of film.

4. The method of claim 3, wherein the micro-lenses are convex lenses.

5. The method of claim 4, wherein the convex lenses are plano-convex lenses.

6. The method of claim 2, wherein the third film surface is made either transmissive but opaque at the focal points or opaque but transmissive at the focal points.

7. The method of claim 6, wherein the light is blocked if the second film surface overlaps the third film surface and the third film surface is transmissive but opaque at the focal points; the light is also considered blocked if the second film surface separates from the third film surface and the third film surface is opaque but transmissive at the focal points; wherein the light is let through if the second film surface separates from the third film surface and the third film surface is transmissive but opaque at the focal points; the light is also considered let through if the second film surface overlaps the third film surface and the third film surface is opaque but transmissive at the focal points.

8. The method of claim 1, wherein the adjustment is inflating or deflating the air layer with a pump or valve.

9. The method of claim 1, wherein the micro-lenses are circular or cylindrical lenses; and
   each of the micro-lenses has an inlaid section that has an opaque side to prevent light that enters its inlaid section from passing into its adjacent micro-lenses' inlaid sections.

10. The method of claim 1, wherein the distance between the second and third film surfaces is determined by the air layer.

11. The method of claim 1, wherein a magnetic piece is inlaid in the first layer of film along the second film surface and another matching magnetic piece is inlaid in the second layer of film along the third film surface.

12. The method of claim 11, wherein the first and second layers of film have an array of said magnetic pieces.

13. An apparatus for adding light transmission control to a light transmissive surface, comprising:
   a first layer of transparent film having a first and second film surface, wherein the first film surface is on the light transmissive surface; wherein the first layer of transparent film is inlaid with an array of convex lenses having their focal points located on the second film surface;
   a second layer of transparent film having a third and fourth film surface, wherein the first layer of transparent film is sandwiched between the second layer of transparent film and the light transmissive surface; wherein the second layer of transparent film is inlaid with an array of convex lenses having their focal points located on the third film surface;
   wherein, each convex lens in the first layer of transparent film is center-aligned with a convex lens in the second layer of transparent film and vice versa;
   a layer of air is enclosed between the first and second layers of transparent film and between the second and third film surfaces too;
   wherein a relative distance between the second and third film surfaces is adjustable;
   wherein the light transmission of the light transmissive surface is controlled by adjusting said relative distance.

14. The apparatus of claim 13, wherein the convex lenses in the first layer of transparent film have a refractive index higher than that of the first layer of transparent film; the convex lenses in the second layer of transparent film have a refractive index higher than that of the second layer of transparent film.

15. The apparatus of claim 13, wherein the convex lenses are plano-convex lenses.

16. The apparatus of claim 13, wherein the third film surface is made either transmissive but opaque at the focal points or opaque but transmissive at the focal points.

17. The apparatus of claim 13, wherein the relative distance between the first and second layers of film is adjusted by inflating and deflating the layer of air by using a pump and/or valve; wherein the first or second layer of film can be attached or mounted on a glass wall or window.

18. The apparatus of claim 13, wherein the convex lens are circular or cylindrical lenses.

19. An apparatus for adding light transmission control to a light transmissive surface, comprising:
- a first layer of transparent film inlaid with a convex lens array; wherein focal points of the convex lenses of the first layer of transparent film are on a first film surface of the first layer of transparent film;
- a second layer of transparent film inlaid with a convex lens array; wherein focal points of the convex lenses of the second layer of transparent film are on a second film surface of the second layer of transparent film;
- wherein every convex lens in the first layer of transparent film is center-aligned with a convex lens in the second layer of transparent film and vice versa;
- a layer of air is enclosed between the first and second layers of transparent film as well as between the first and second film surfaces;
- wherein a relative distance between the first and second film surfaces is adjustable;
- wherein the light transmission is controlled by adjusting said relative distance; and
- wherein a magnetic piece is inlaid on the first film surface in the first layer of transparent film and a magnetic piece is inlaid on the second film surface in the second layer of transparent film.

20. The apparatus of claim 19, wherein the magnetic piece in the first layer of transparent film can attach to the magnetic piece in the second layer of transparent film and vice versa.

* * * * *